United States Patent
Beard et al.

(10) Patent No.: US 9,710,709 B1
(45) Date of Patent: Jul. 18, 2017

(54) CASCADE RECOGNITION FOR PERSONAL TRACKING VIA UNMANNED AERIAL VEHICLE (UAV)

(71) Applicant: Trace Live Network Inc., Calgary (CA)

(72) Inventors: Paul Beard, Bigfork, MT (US); Cameron Chell, Calgary (CA); Jamie Clarke, Calgary (CA); Craig McDermott, Cedar Rapids, IA (US); Erika Racicot, Calgary (CA); Paul Readwin, Calgary (CA)

(*) Notice: Subject to any disclaimer, the term of this patent is extended or adjusted under 35 U.S.C. 154(b) by 218 days.

(21) Appl. No.: 14/642,370

(22) Filed: Mar. 9, 2015

Related U.S. Application Data

(60) Provisional application No. 61/949,801, filed on Mar. 7, 2014.

(51) Int. Cl.

| | |
|---|---|
| H04N 7/18 | (2006.01) |
| H04N 5/225 | (2006.01) |
| G06K 9/00 | (2006.01) |
| G06K 9/62 | (2006.01) |
| G06F 17/30 | (2006.01) |
| H04N 5/44 | (2011.01) |
| G06T 7/20 | (2017.01) |
| G06K 9/46 | (2006.01) |
| G06F 3/044 | (2006.01) |

(Continued)

(52) U.S. Cl.
CPC .......... *G06K 9/0063* (2013.01); *B64C 39/024* (2013.01); *B64D 47/08* (2013.01); *G06F 3/044* (2013.01); *G06F 17/3028* (2013.01); *G06K 9/00476* (2013.01); *G06K 9/46* (2013.01); *G06K 9/4652* (2013.01); *G06K 9/6201* (2013.01); *G06T 7/20* (2013.01); *H04N 5/44* (2013.01); *H04N 7/183* (2013.01); *B64C 2201/024* (2013.01); *B64C 2201/127* (2013.01); *B64C 2201/14* (2013.01)

(58) Field of Classification Search
None
See application file for complete search history.

(56) References Cited

U.S. PATENT DOCUMENTS

| 8,908,573 B1* | 12/2014 | Wang | ........................ H04L 5/26 370/280 |
|---|---|---|---|
| 2007/0230742 A1* | 10/2007 | Burns | ..................... G06T 7/207 382/103 |

(Continued)

*Primary Examiner* — Heather Jones
(74) *Attorney, Agent, or Firm* — Suiter Swantz pc llo

(57) ABSTRACT

Systems and methods for tracking a subject using an unmanned aerial vehicle (UAV) are disclosed. An unmanned aerial vehicle (UAV) includes an onboard camera to capture/stream multiple images. An onboard visual recognition module isolates image elements by analyzing the captured images, and determines whether the image elements correspond or do not correspond to the subject. Current image elements corresponding to a subject are stored in a positive database, and non-corresponding current image elements are stored in a negative database. An onboard subject tracking module defines the chosen subject, determines attributes of the subject based on comparisons of image elements, and follows the subject by directing the attitude control system to adjust the velocity and orientation of the UAV based on the determined attributes.

26 Claims, 9 Drawing Sheets

(51) Int. Cl.
*B64D 47/08* (2006.01)
*B64C 39/02* (2006.01)

(56) References Cited

U.S. PATENT DOCUMENTS

| | | | |
|---|---|---|---|
| 2008/0085048 A1* | 4/2008 | Venetsky | G06K 9/00355 382/153 |
| 2009/0222149 A1* | 9/2009 | Murray | A63H 30/04 701/2 |
| 2010/0084513 A1* | 4/2010 | Gariepy | B64C 39/024 244/190 |

* cited by examiner

CASCADE RECOGNITION FOR PERSONAL TRACKING VIA UNMANNED AERIAL VEHICLE (UAV)

CROSS-REFERENCE TO RELATED APPLICATIONS

This application claims priority under 35 U.S.C. §119(e) to provisional patent application U.S. Ser. No. 61/949,801 filed on Mar. 7, 2014. Said application is herein incorporated by reference in its entirety.

TECHNICAL FIELD

Embodiments of the present invention relate generally to unmanned aerial vehicles (UAVs) and particularly to systems and methods for selecting and following a moving subject individual or object while photographing the subject via onboard camera.

BACKGROUND

Live broadcasting of competitions or athletic events in real time or near real time is generally accomplished with large camera crews and multiple camera operators, each having their own video/audio equipment. Stationary mounts, helicopters, blimps, and other bulky vehicles have also been used. The space and time necessary to coordinate the large crews and bulky vehicles can be economically and logistically taxing. Additionally, for individuals or small, informal groups interested in capturing video and/or images from inaccessible locations and streaming these images to one or more remote viewers in real time or near real time, professional-grade live broadcasting equipment of this nature is not feasible. Therefore, a smaller, less logistically demanding, and economically feasible alternative for live broadcasting is desirable.

SUMMARY

It is to be understood that both the foregoing general description and the following detailed description are only for illustrative and explanatory purposes, and are not necessarily restrictive of the invention as claimed. The accompanying drawings, which are incorporated in and constitute a part of the specification, illustrate embodiments of the invention and together with the general description, serve to explain the principles of the invention.

One or more cascade recognition systems for acquiring and following a subject with an unmanned aerial vehicle (UAV) are disclosed. In one embodiment, the system includes one or more cameras fixed to the UAV and configured to capture one or more images. In one embodiment, the system includes an attitude control system configured to adjust one or more rotor speeds of the UAV. In one embodiment, the cascade recognition system includes a visual recognition module configured to: isolate one or more current image elements by analyzing the one or more images captured; determine whether the one or more current image elements is a positive image element corresponding to the subject or a negative image element not corresponding to the subject; store the one or more positive image elements in a positive database; and store the one or more negative image elements in a negative database. In one embodiment, the cascade recognition system includes a subject tracking module coupled to the visual recognition module and to the attitude control system of the UAV and configured to: define a subject by capturing one or more reference images via at least one camera of the UAV; determine at least one attribute of the subject by performing a comparison of at least one current image element to a positive image element, a negative image element, or a reference image element; and direct the attitude control system to adjust a rotor speed of the UAV based on the at least one attribute of the subject.

One or more unmanned aerial vehicles (UAV) for acquiring and following a subject, are disclosed. In one embodiment, the UAV includes an attitude control system configured to adjust one or more rotor speeds of the UAV (thereby adjusting a velocity of the UAV, a heading of the UAV, or an orientation of the UAV). In one embodiment, the UAV includes one or more cameras configured to capture one or more images. In one embodiment, the UAV includes one or more data storage units. In one embodiment, the UAV includes one or more processors coupled to the one or more cameras, one or more data storage units, and to the attitude control system, the one or more processors are configured to: isolate one or more current image elements from the one or more captured images; designate one or more image elements as a positive image element corresponding to the subject, a negative image element not corresponding to the subject, or a reference image element corresponding to the subject; compare one or more current image elements to at least one of a positive image element stored in a first database, a negative image element stored in a negative database, and a reference image element stored in a third database; determine one or more attributes of the subject based on at least the comparisons; and direct the attitude control system to adjust at least one rotor speed of the UAV based on the one or more attributes of the subject.

One or more methods of acquiring and following a subject via an unmanned aerial vehicle (UAV) are disclosed. In one embodiment, the method includes defining a subject by capturing at least one reference image via at least one camera of the UAV. In one embodiment, the method includes extracting at least one current image element from the at least one captured image. In one embodiment, the method includes determining whether the at least one current image element is a positive image element corresponding to the subject or a negative image element not corresponding to the subject. In one embodiment, the method includes storing the at least one positive image element in a positive database. In one embodiment, the method includes storing the at least one negative image element in a negative database. In one embodiment, the method includes determining at least one attribute of the subject by performing a comparison of the at least one current image element to at least one of a positive image element, a negative image element, and a reference image element.

BRIEF DESCRIPTION OF THE FIGURES

Embodiments of the presently disclosed invention may be better understood by those skilled in the art by reference to the accompanying figures in which.

DETAILED DESCRIPTION

Features of the invention in its various embodiments are exemplified by the following descriptions with reference to the accompanying drawings, which describe the invention with further detail. These drawings depict only selected embodiments of the invention, and should not be considered to limit its scope in any way.

Embodiments of this disclosure generally relate to personal, visual recognition and tracking and more particularly to a system, apparatus, and method for tracking with an Unmanned Aerial Vehicle (UAV). In operation, embodiments of this disclosure form an integrated system utilizing a UAV, a camera, a visual recognition module, and a subject tracking module, to select and follow a selected subject (ex.—targeted individual). In this regard, the UAV captures a series of pictures of multiple subjects, any of which may be tracked. The series of pictures are separated into images with distinct image elements utilizing cascading visual recognition techniques and/or Haar-like features, Viola-Jones facial recognition and infrared, color pattern detection. The UAV stores the images and distinct image elements in one or more databases. A comparison is made between distinct image elements and one or more stored/known image elements. Based on the comparison the UAV may be directed to alter its position or heading to follow an identified subject (e.g., keep the subject centrally framed).

Figure 1A:
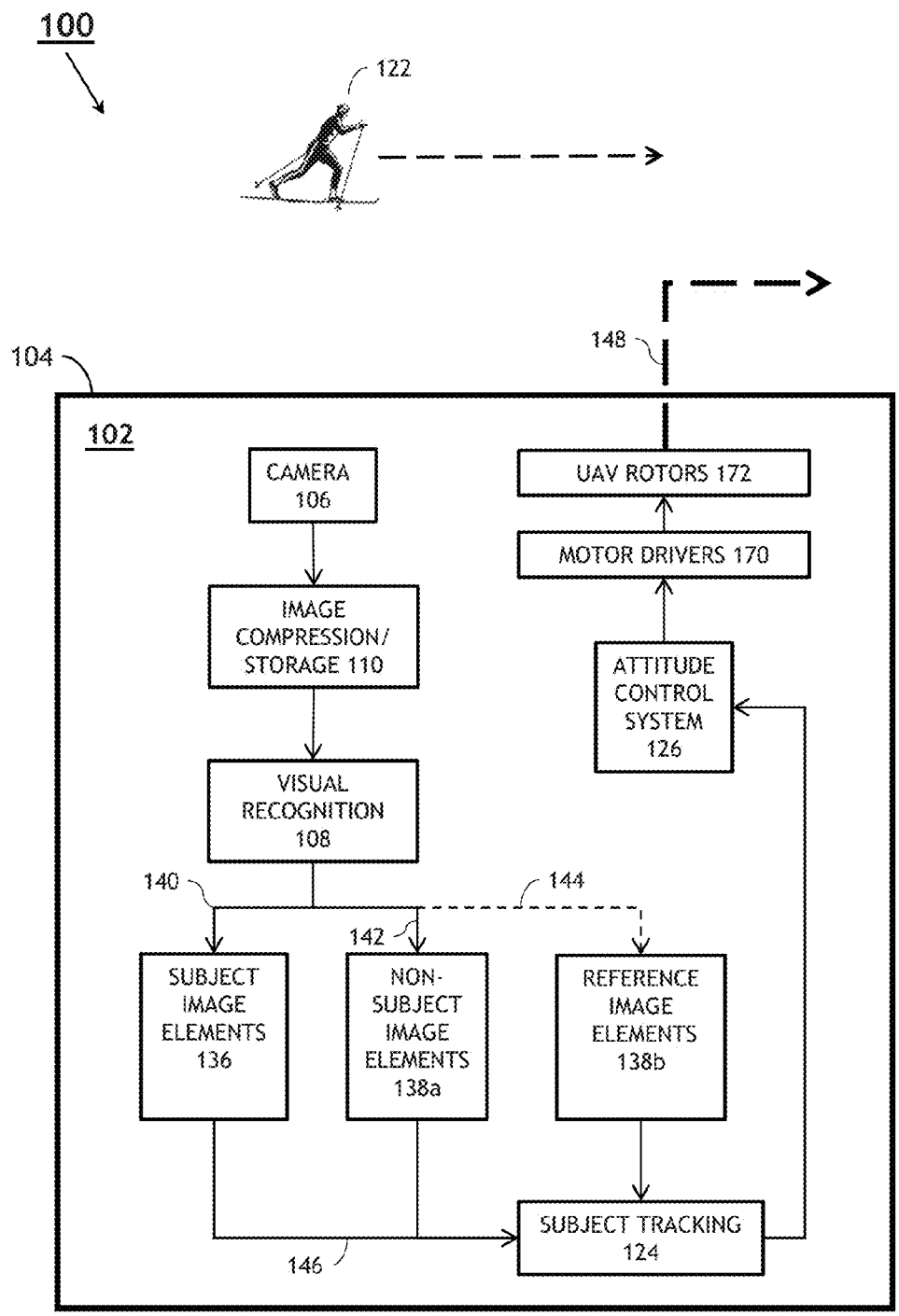
FIG. 1A illustrates a schematic diagram of a system for acquiring and following a subject with an unmanned aerial vehicle (UAV), according to embodiments of this disclosure.

Referring generally to FIG. 1A, a cascade recognition system 100 for acquiring and following a subject with an unmanned aerial vehicle (UAV) comprises the UAV 102 and one or more cameras 106. Applicant notes that for purposes of simplicity the camera 106, the UAV 102, and the other components of the system 100 have been generally depicted in a simplified schematic diagram. This depiction, including the components and geometrical configuration, is not limiting and is provided for illustrative purposes only. Applicant further notes that the UAV 102, the camera 106, and the other components of the system 100 may include any number of elements to carry out the image capturing and tracking processes contemplated in this disclosure. For example, the camera 106 may include, but is not limited to, one or more optics, one or more apertures, one or more image sensors, and one or more adjustable mounts. By way of another example, the UAV 102 may include, but is not limited to, a different rotor configuration (e.g., three, six, or eight rotors instead of the four depicted in FIGS. 6A-6C), an audio tracking system, and one or more processors.

In one embodiment, the system 100 includes one or more processors (not shown). In one embodiment, the one or more processors are configured to execute and implement one or more instructions or sets of instructions. In one embodiment, the one or more instructions executed and implemented are stored in one or more memories (e.g., non-transitory memory) (not shown).

In one embodiment, referring generally to FIG. 1A, the one or more memories are separated into one or more databases. For example, the one or more memories may be separated into a positive database 136 for storing one or more positive image elements associated with a first subject to be tracked, a negative database 138a for storing one or more negative image elements that are not associated with a subject to be tracked, and a third database 138b for storing one or more reference image elements.

In one embodiment, the one or more memories are separated according to their content. For example, the one or more memories may be separated into a positive database 136 for storing one or more image elements associated with a subject to be tracked, and a negative database 138a for storing one or more image elements that are not associated with the subject being tracked. Applicant notes that the general configuration and geometrical orientation of the one or more memories or the one or more databases is not limiting. Applicant further notes that other configurations will be apparent to those skilled in the art.

In one embodiment, the system 100 includes one or more cameras 106 fixed to the UAV 102 and operably/communicatively coupled to the one or more processors. In one embodiment, the one or more cameras 106 are configured to capture one or more images for visual recognition and analysis processes executed by the one or more processors. In one embodiment the images captured correspond to one or more subjects to be tracked. In one embodiment, the one or more subjects to be tracked (e.g., subject 122) is a human, such as a skier. In this regard, the subject is referred to as a subject (e.g., subject 122).

In one embodiment, referring to FIG. 1A, the one or more instructions executed and implemented by the one or more processors of system 100 are separated into multiple processes or sets of instructions, and further separated into multiple sub-process or sub-sets of instructions. For example, the one or more instructions when executed and implemented by the one or more processors may cause the one or more processors to: execute the capturing of one or more images using camera 106; execute an image compression and storage process 110; execute an image analysis process and a subject acquisition sub-process; execute a subject profile matching process, an image element classification sub-process, and a subject and environment distinguishing sub-process; execute a subject tracking process 124; determine an attitude of the UAV and an orientation (e.g., direction of travel 128) of the subject 122; and adjust the attitude control system 126 such that one or more of the orientation and the direction of travel 132 of the UAV matches the orientation or direction of travel 128 of the subject 122.

In one embodiment, the cascade recognition system 100 includes a visual recognition module 108. In one embodiment, the visual recognition module 108 is operably/communicatively coupled to one or more cameras 106. In one embodiment, the visual recognition module 108 further comprises the image analysis process, the subject acquisition sub-process, the subject profile matching process, and the image element classification sub-process. For example, referring to FIG. 1A, the visual recognition module 108 may be configured to: isolate one or more current image elements of a subject by analyzing the one or more images; determine 140 whether the one or more current image elements is a positive current image element corresponding to a subject, or determine 142 whether the one or more current image elements is a negative current image element not corresponding to the subject; store the one or more positive current image elements in a positive database 136; and store the one or more negative current image elements in a negative database 138a.

In one embodiment, the cascade recognition system 100 includes a subject tracking module 124 operably/communicatively coupled to the visual recognition module 108 and to the attitude control system 126 of the UAV 102. In one embodiment, such an operative/communicative coupling configures the UAV 102 to: define a subject (e.g., subject 122) by capturing at least one reference image via at least one camera 106 of the UAV; designate one or more first images as a reference image, and the associated image elements as reference image elements; determine 146 at least one attribute of the subject by performing a comparison of at least one current image element to at least one of a positive image element, a negative image element, and a reference image element; and adjust a rotor speed of at least one rotor of the UAV (e.g., direct the attitude control system 126 and coupled motor drivers 170/UAV rotors 172) based on the at least one attribute of the subject.

In one embodiment, the visual recognition module 108 comprises a subject acquisition module, or a subject acquisition process. In this regard, the visual recognition module 108 utilizes both macro-scaled and micro-scaled visual recognition techniques/algorithms to determine whether one or more reference image elements is a positive reference image element corresponding to the subject 122 or a negative reference image element not corresponding to the subject, populating negative database 138b accordingly.

Figure 1B:
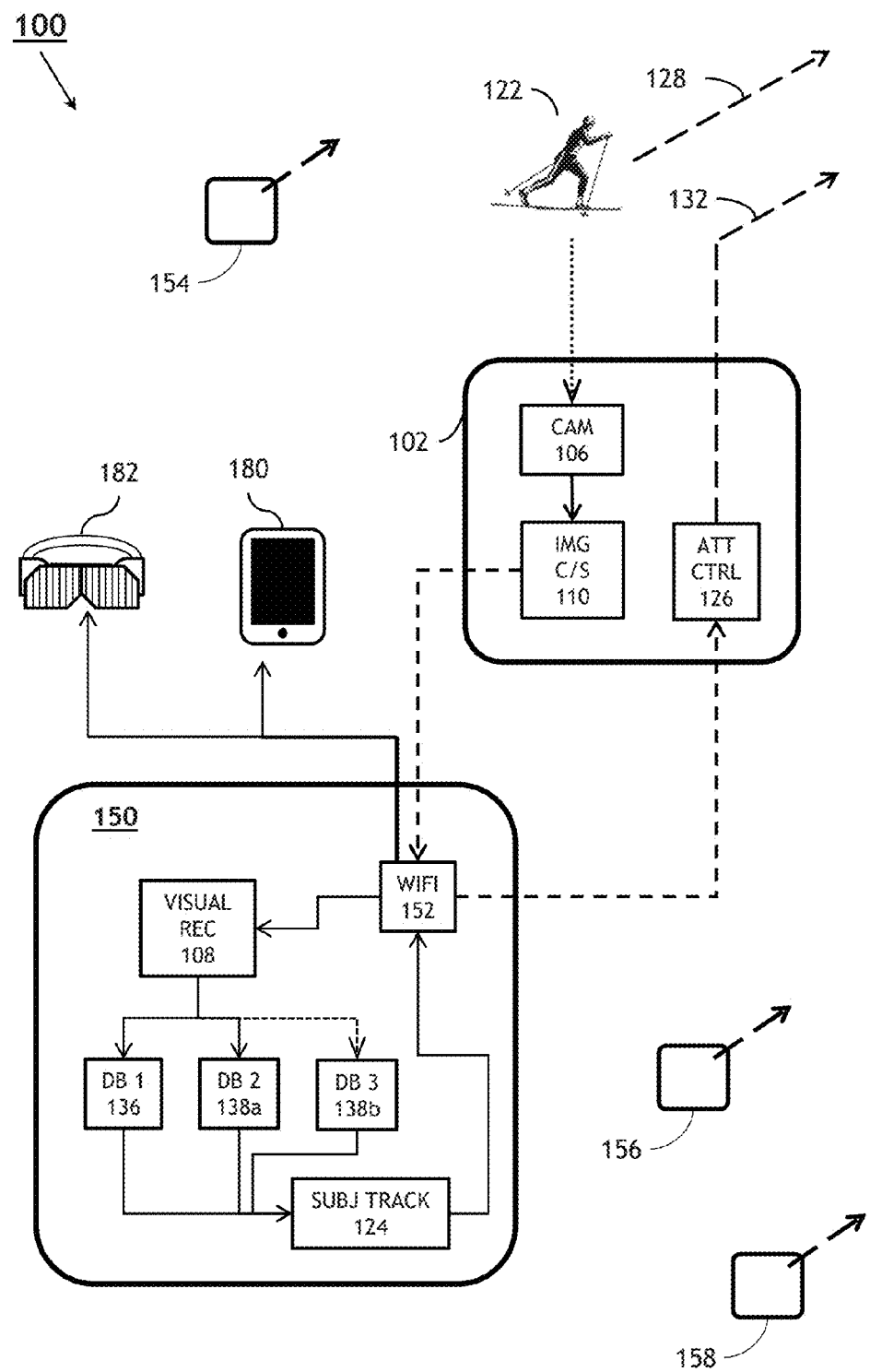
FIG. 1B illustrates a schematic diagram of a system for acquiring and following a subject with one or more UAVs using multiple storage databases and a base station, according to embodiments of this disclosure.

In one embodiment, referring to FIG. 1B, the system 100 includes a base station 150 configured to receive and process image data from multiple UAVs. For example, UAV 102, UAV 154, UAV 156, and UAV 158 may capture images through onboard cameras and perform some image processing functions or associated subprocesses (e.g., at least one of: selecting a subject (e.g., potential subject 122); visual recognition 108; image compression and storage 110; and subject tracking 124). In this regard, each individual UAV may be further configured to transmit streaming images, processed images, and/or image elements via wireless device 152 to the base station 150.

In one embodiment, the base station 150 conducts the image processing functions and associated subprocesses for each UAV (e.g., at least one of: selecting a subject (e.g., potential subject 122); visual recognition 108; image compression and storage 110; and subject tracking 124). The base station 150 may be further configured to communicate with the individual attitude systems 126 of multiple UAVs, issuing commands to one or more UAVs to acquire or track either a single subject 122 or multiple subjects.

Figure 1C:
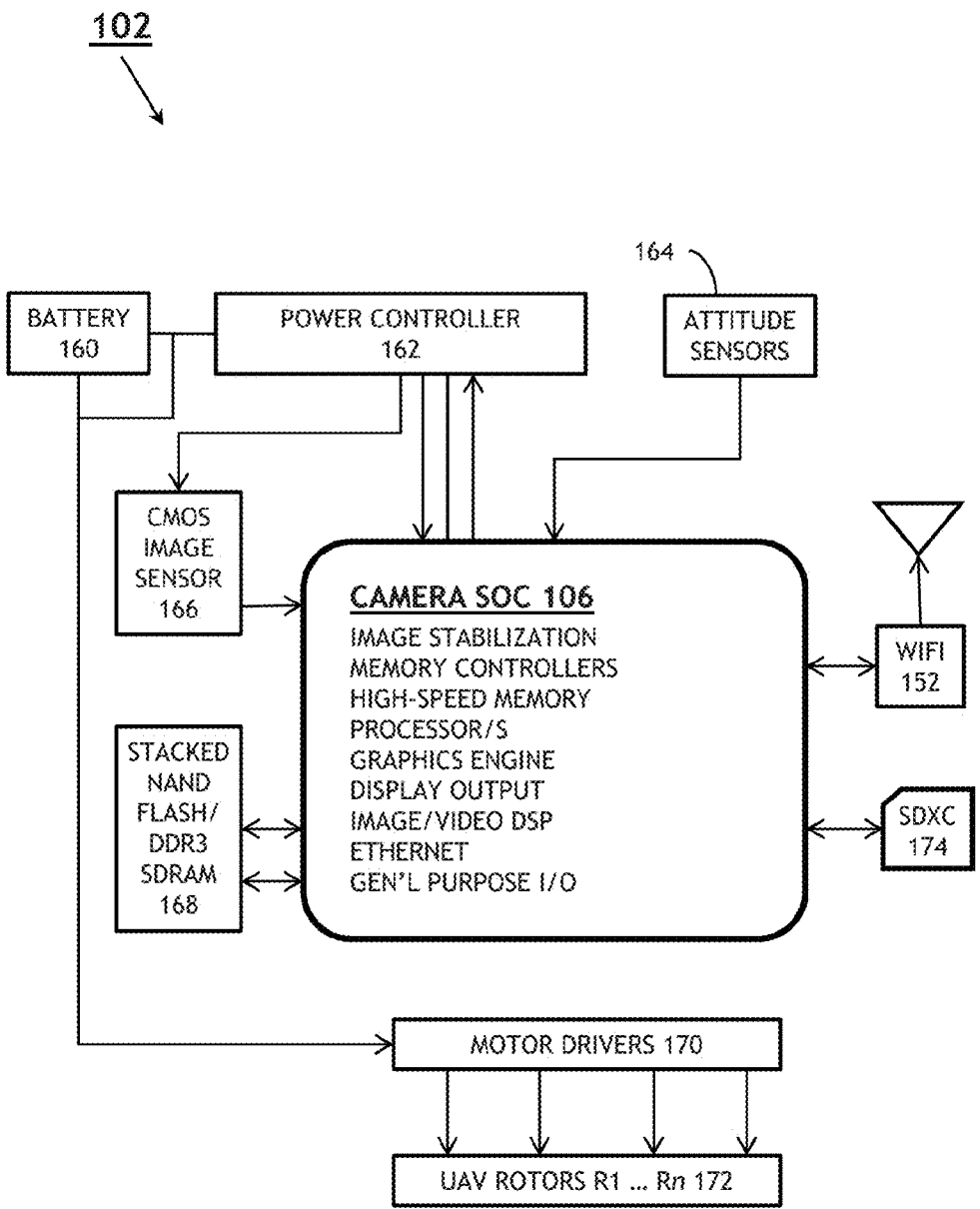
FIG. 1C illustrates a schematic diagram of a UAV in a system for acquiring and following a subject, according to embodiments of this disclosure.

In one embodiment, referring to FIGS. 1A and 1C, the UAV 102 of system 100 includes an airframe 104. In one embodiment, the system 100 includes a UAV with one or more rotors 172 with one or more motor drivers 170 (ex.—electronic speed controls) fixed to the airframe 104, the one or more rotors 172 configured to rotate at one or more rotor speeds. For example, the UAV 102 may be a rotorcraft incorporating any appropriate number of rotors (e.g., a tri-copter, quadcopter, hexacopter, or octocopter).

In one embodiment, the UAV 102 of system 100 includes a power source. For example, the power source may be battery 160. In one embodiment, the UAV 102 includes a power controller 162. In one embodiment, the UAV 102 includes one or more sensors for tracking the position of the UAV 102. For example, the one or more sensors may include attitude sensors 164. In one embodiment, the UAV includes one or more sensors for tracking the position of a subject. For example, the one or more sensors may include CMOS image sensor 166.

In one embodiment, the UAV 102 includes one or more cameras 106 operably connected to one or more processors, which are configured to move according to one or more executed instructions or sets of executed instructions. For example, the one or more cameras 106 may include one or more camera mounts that move in multiple directions upon receiving one or more signals. In one embodiment, one or more components of the one or more cameras 106 are configured to move according to one or more executed instructions or sets of executed instructions. For example, one or more apertures may increase or decrease in size upon receiving one or more signals.

In one embodiment, the one or more cameras 106 further comprise an image stabilization module (e.g., set of programmed instructions to conduct image stabilization); one or more memory controllers; a high-speed memory (e.g., partitioned into separate databases); a graphics engine; one or more outputs, including, but not limited to, a display output and an audio output; an image/video DSP; one or more devices configured to execute wireless transmission, including, but not limited to, an Ethernet device; and one or more devices for receiving and executing general purpose input and output (I/O) commands. In one embodiment, the one or more cameras 106 may be configured to receive and/or communicate with one or more external memory devices. For example, the one or more cameras 106 may include a slot for receiving and/or communicating with an external SDXC card 174 or other external flash memory devices.

In one embodiment, the high-speed memory includes one or more types of memory 168. For example, the one or more types of memory may include one or more solid state drives (SSD) (e.g., one or more stacked NAND flash chips), and one or more random access memories (RAM) (e.g., DDR3 SDRAM).

In one embodiment, the UAV 102 of system 100 includes a wireless transceiver for sending and receiving one or more wireless signals. For example, UAV 102 may include Wi-Fi transceiver 152.

The embodiments of system 100 and UAV 102 (e.g., illustrated in FIGS. 1A-1C) may be further configured as described herein. In addition, system 100 and UAV 102 may be configured to perform any other step(s) of any of the method embodiment(s) described herein. The following method embodiments relate to visual recognition and subject tracking using one or more UAVs. It is generally recognized that system 100 and UAV 102 are suitable for implementing the visual recognition and subject tracking steps of the following embodiments. It is noted, however, the methods described below are not limited to the architectures of system 100 or UAV 102.

Figure 2:
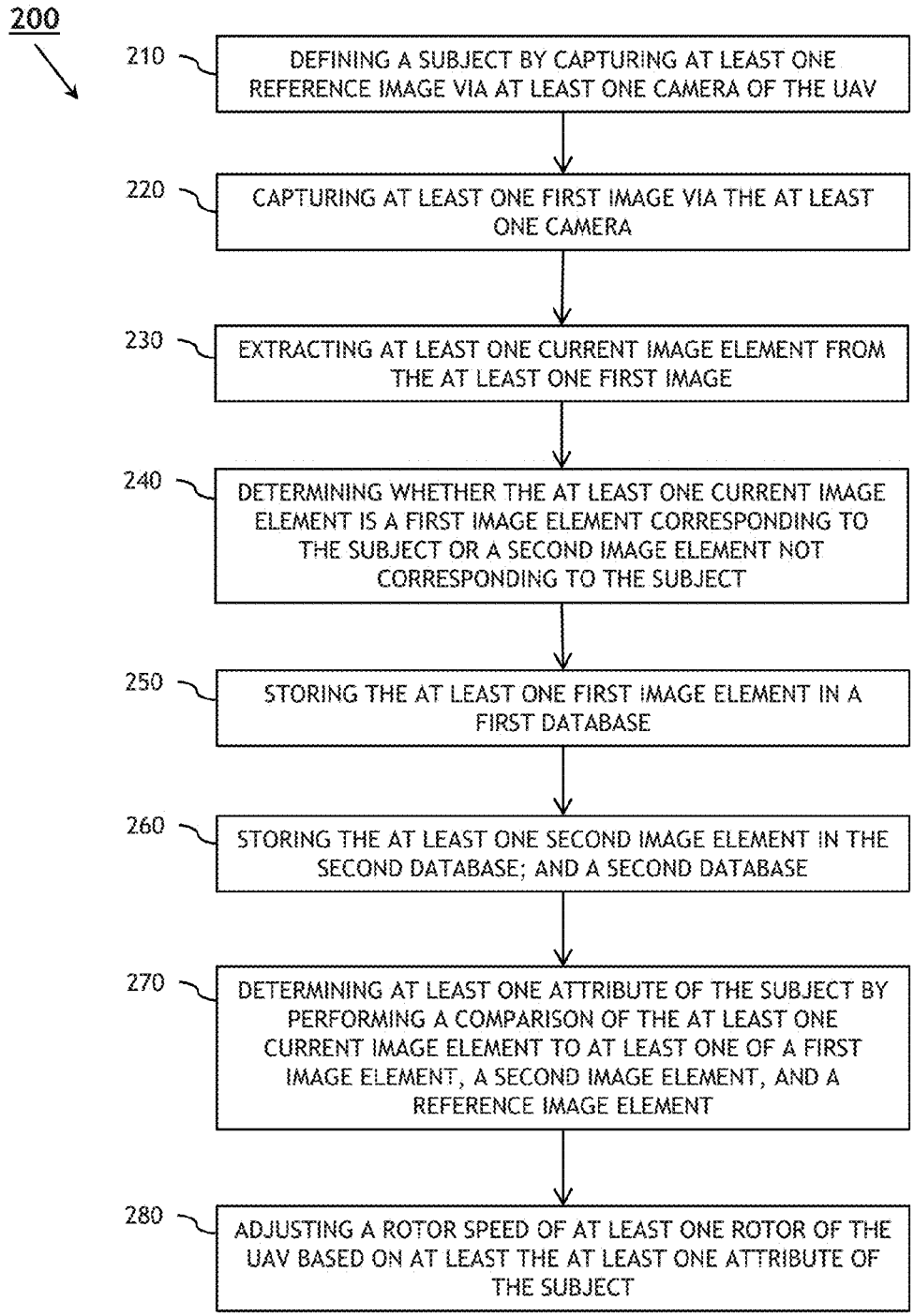
FIG. 2 is a process flow diagram of a method of acquiring and following a subject with an UAV, according to embodiments of this disclosure.

FIG. 2 illustrates a flow diagram depicting a method 200 of acquiring and following a subject with an unmanned aerial vehicle (UAV), in accordance with one or more embodiments of the present disclosure.

In one embodiment, the cascade recognition system 100 conducts a preparatory step of generating one or more subject profiles, each profile corresponding to a subject 122. In one embodiment, the preparatory step comprises gathering characteristic information for each of a group of potential subjects. In this regard, the characteristic information will be used by the visual recognition module 108 to identify positive image elements corresponding to the subject 122. For example, one or more cameras, including, but not limited to camera 106, may be used to create one or more subject profiles, which may include one or more subject characteristic image elements specific to each of a group of potential subjects (e.g., including subject 122) and extracted from captured images featuring the potential subjects. Camera 106 may capture one or more images featuring a subject or potential subject, which the subject tracking module may designate as reference images. Reference image elements may then be isolated from the reference images. Reference image elements may be reference image elements corresponding to a subject or potential subject (e.g., a face or facial feature, a Haar-like feature, a hue or color scheme, a pattern or texture, a shape corresponding to a body or body part of the subject) or reference image elements not directly corresponding to the subject (e.g., the background and environment in which the subject is pictured). In this regard, the one or more subject characteristic image elements may be stored in one or more databases (e.g., in negative database 138b) for a comparison with one or more real-time image elements (e.g., positive or negative image elements extracted from images captured in real time or near real time).

In one embodiment, the preparatory step of system 100 also includes gathering non-subject characteristic information for a group of reference objects. For example, one or more natural features, manmade structures, or landmarks (e.g., tree 408, tower 412, or mountain 414, FIGS. 4A-4B) may exist along or in the path of a ski course. In this regard, one or more cameras including, but not limited to, camera 106, may be used to create one or more subject profiles, which may include one or more reference object characteristic image elements specific to a group of potential subjects (e.g., tree 408, tower 412, or mountain 414). In one embodiment, the one or more reference object characteristic image elements are stored in one or more databases (e.g., as reference images in negative database 138b) for a comparison with one or more real-time image elements (e.g., negative image elements extracted from images captured in real time or near real time). In one embodiment, the subject tracking module 124 further analyzes subject characteristic and subject noncharacteristic reference image elements to determine reference relationships (e.g., a relative height of the subject compared to a natural feature, a hue associated with the subject compared to the hue of a natural feature such as the sky, the absolute location of a background element identified as a known natural feature or landmark). In one embodiment, reference relationships are stored in the one or more databases (e.g., negative database 138b) for comparison with current image elements.

In one embodiment, the UAV 102 of system 100 also includes one or more transmitters for transmitting one or more images. In one embodiment the UAV 102 of system 100 includes one or more receivers for receiving data associated with one or more subjects (e.g., subject 122) or one or more command gestures. In one embodiment, the UAV of system 100 includes one or more transceivers (e.g., Wi-Fi transceiver 152) capable of transmitting and receiving data.

In some embodiments, a user may receive image data captured by the onboard camera of a UAV, or processed by the cascade recognition system 100, through a pair of goggles 182 or a similar linked device 180 enabling remote viewing. Such a remote viewing system may additionally allow the user to select (e.g., via a user interface of the smartphone 180 or similar handheld device) an image element or a subject to acquire or track, or receive information associated with the position of the UAV or a subject. The remote viewing system may also incorporate an image intensifier or similar device to assist in low-light image recognition (ex.—night vision).

In step 210, the method of acquiring and following a subject with an UAV includes defining a subject by capturing at least one reference image via one or more cameras of the UAV. In one embodiment, the subject is defined by a remote user, communicatively coupled to the system 100 (e.g., via Wi-Fi), who selects a subject to follow or track. For example, a particular person or persons may be designated by a remote user as a subject 122. For instance, referring to FIG. 1B, a remote user using a smartphone 180, interactive goggles 182, tablet, or other media device may indicate a particular competitor or competitors they wish to follow.

In one embodiment, the UAV may remotely or autonomously designate a person as a subject for the UAV to track or follow in motion. For example, at a cross-country ski race the UAV may be assigned (e.g., by a remote user, by a base station, or by an operator/programmer of the UAV) to track a particular skier 122 along the course and relay information about his or her progress (e.g., still images, video feed, position, etc.) to coaches or viewers stationed elsewhere. In one embodiment, the UAV defines as its subject 122 an individual with various distinguishing features, including, but not limited to, features such as height and weight, hair color and texture, facial composition, clothing color and texture, facial hair or the lack thereof.

In one embodiment, the UAV 102 switches subjects between various members of a team. In one embodiment, the UAV 102 tracks the lead skier 122 whoever he or she may be. For example, the UAV 102 may be configured to select one subject 122 from a finite set of potential subjects for which associated subject profiles have been uploaded, swapping the appropriate image elements between one or more databases as a new subject is selected. In this regard, if multiple persons (subjects, potential subjects, and non-subjects) or potential subjects are in the field of view of the UAV 102, then the UAV 102 may use cascade recognition techniques to distinguish subjects from non-subjects on a continual basis.

In step 220, the UAV 102 captures one or more first images via the one or more cameras 106. In one embodiment, capturing one or more first images includes utilizing one or more data compression algorithms 110 to efficiently transmit, store, and/or analyze the one or more images captured.

In one embodiment, the one or more instructions executed by the one or more processors of system 100 comprise an image compression and storage process 110. In one embodiment, the system 100 may initiate one or more algorithms to compress the one or more images being captured by the one or more cameras 106. For example, the one or more algorithms initiated by system 100 may assign a gray-scale value to each pixel of the one or more images captured. In this regard, the one or more algorithms initiated may recognize a series of repeating gray-scale values and assign to a portion of the one or more images captured at least one of a compression label, a compression position/coordinate, or a compression gray-scale-repeat number (e.g., indicating the number of repeating pixels associated with the compression value). In one embodiment, the system 100 or a base station (not shown) includes a codebook for decompressing the one or more images using one or more of the compression label, the compression position/coordinate, or the compression gray-scale repeat number. Applicant notes that the algorithms for image compression initiated by the image compression/storage module 110 may vary according to image compression processes known in the art. In this regard, the examples for the compression algorithms given herein are merely for illustrative and explanatory purposes, and are not limiting.

In one embodiment, referring to FIGS. 1A-1B, a UAV (e.g., UAV 102) includes an onboard cascade visual recognition system 100 according to the present disclosure, the system operably/communicatively coupled to the one or more cameras 106. The one or more cameras 106 are configured to capture a stream of images, either as a video feed or as periodic still images. In one embodiment, a user may preprogram or adjust the rate at which images are captured, increasing the capture rate for greater precision or reducing the capture rate for greater efficiency of operation or longer battery life. For example, captured images may include real-time (or near real-time) images of human beings who may or may not be designated as subjects (e.g., defined in step 210 as subject 122). In one embodiment, referring to FIG. 4A-4B, the captured images include additional background elements capable of conveying information, such as man-made structures or landmarks (buildings/towers) and natural features (terrain, vegetation, mountains, bodies of water). For example, the information conveyed by background (negative) image elements may establish reference relationships between one or more reference image elements. In this regard, the information conveyed includes, but is not limited to, time of day, weather, and medium-scale positioning. For example, an additional background image element may include the sky 410. Reference relationships involving the sky 410 may indicate time of day (darker but non-black sky may indicate evening or early morning), approximate position (the location of the sun may indicate a westerly or easterly direction, or stellar patterns may indicate an approximate latitude), or weather conditions (cloud cover or overcast skies may indicate imminent precipitation).

Figure 3A:
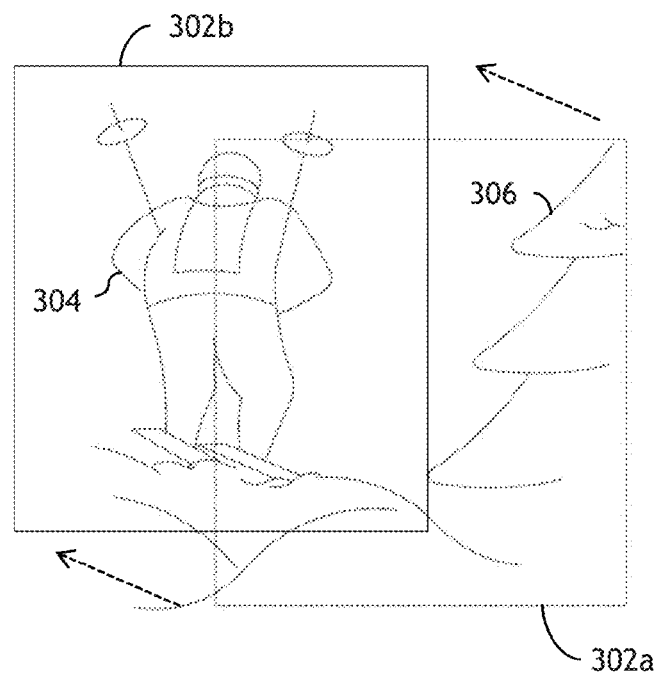
FIGS. 3A-3B illustrate respective views of an image tracking/analysis process of the UAV utilizing macro-scaled visual recognition techniques to acquire and center one or more images of a subject to track the subject, according to embodiments of this disclosure.
Figure 3B:
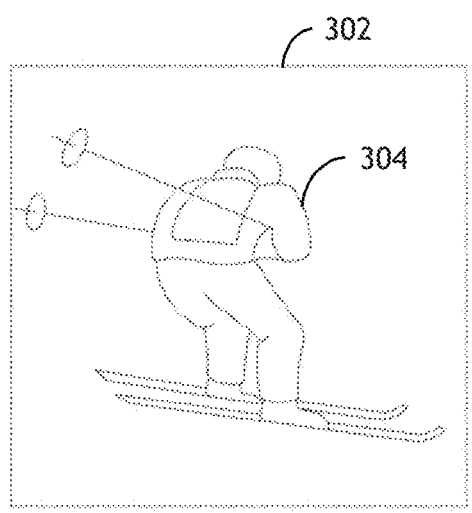

In one embodiment of step 220, capturing one or more positive image elements includes utilizing macro-scaled visual recognition techniques/algorithms to distinguish subjects (and their corresponding image elements) from non-subjects (and their corresponding image elements). For example, the macro-scaled techniques/algorithms include, but are not limited to, motion sensing capabilities, color and shape discernment, and other broad-level visual recognition techniques/algorithms. For example, while tracking a subject 304 at speed (e.g., at faster velocities while following the subject from behind, as depicted in FIGS. 3A-3B), the visual recognition module 108 may not be able to identify positive image elements corresponding to the subject 304 based on identification of facial features or other micro-scale characteristics. Therefore, at speed the visual recognition module 108 may instead verify the subject 304 (and corresponding positive image elements) via less precise but more efficient macro-scaled or medium-scaled techniques. For example, the visual recognition module 108 may identify the subject 304 based on a known hue or color scheme corresponding to the subject's clothing, based on whether the general shape of the subject corresponds to reference images of the subject in motion (e.g., in various positions associated with skiing), or based on identification of a specific pattern (e.g., a QR code) affixed to the clothing of the subject 122.

In step 230, the visual recognition module 108 extracts one or more current image elements from the one or more first images (e.g., real-time images) captured in step 220. In one embodiment, extracting the one or more current image elements includes analyzing the one or more real-time images to determine whether the current image elements are positive image elements or negative image elements.

Figure 4A:
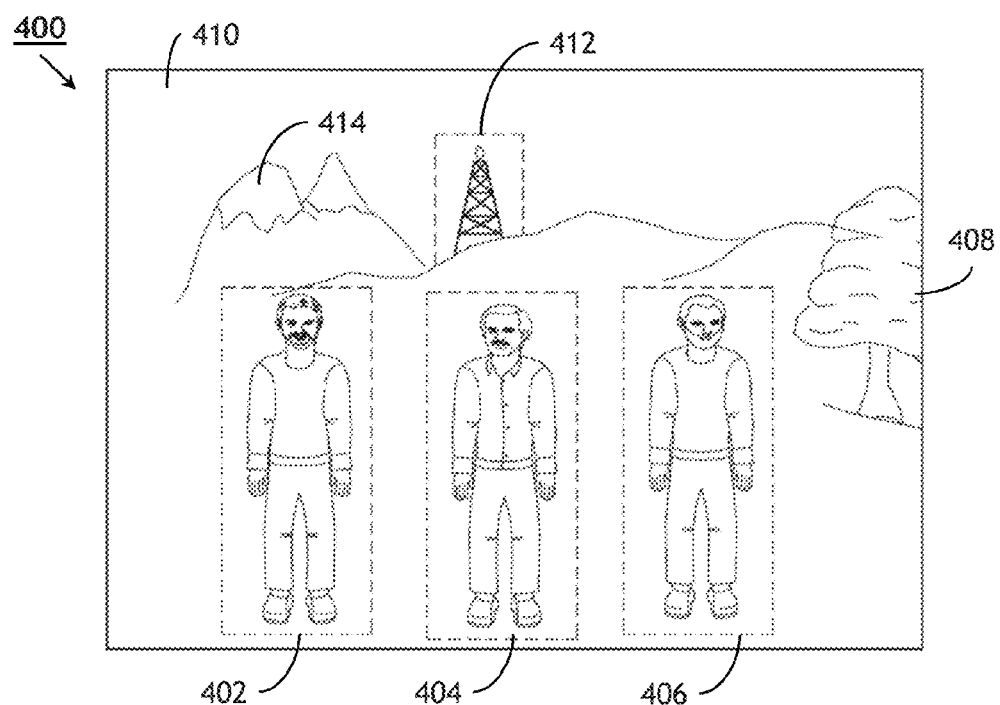
FIGS. 4A-4B illustrate respective views of an image tracking/analysis process of an UAV utilizing medium-scaled visual recognition techniques to acquire one or more images of a subject to track the subject, according to embodiments of this disclosure.

In one embodiment, referring to FIGS. 1A and 4A, the cascade recognition system 100 of the UAV 102 may initially separate a captured and compressed image 400 into a group of individual elements (402, 404, 406, 408, 410, 412, 414) using medium-scale visual recognition techniques and/or algorithms. For example, the visual recognition module 108 of UAV 102 may identify one or more current image elements, including three human beings 402, 404, and 406, a tree in the foreground 408, the sky 410, a tower 412, and a mountain 414 in the background, then extract the one or more current image elements for analysis and storage.

In one embodiment, the medium-scale visual recognition techniques and/or algorithms include identifying, analyzing, and determining medium-scaled characteristics. For example, in one embodiment, medium-scaled characteristics may include shape, texture, color schemes, and components of an object (e.g., distinguishing human arms/legs from arboreal trunks/branches).

In one embodiment, referring to FIGS. 1A and 3A-4B, system 100 utilizes a combination of macro-scaled techniques/algorithms and medium-scaled techniques/algorithms of the visual recognition module 108 to identify and extract positive current image elements corresponding to one or more subjects 122. For example, the system 100 may use camera 106 to make broad scans to identify a group of image elements corresponding to subjects, potential subjects, or non-subjects. When capturing images in step 220, the visual recognition module 108 may separate images (e.g., image 400) into small chunks (image elements 402, 404, 406, 408, 410, 412, and 414), divide them into sortable objects (e.g., subjects, non-subjects, and/or landmarks), and analyze (e.g., 140, 142, or 144) the specifics of the resulting image elements.

In step 240, cascade recognition system 100 determines whether the one or more current image elements are positive image elements or negative image elements. In this regard, the visual recognition module 108 determines 140 whether the one or more current image elements are one or more positive image elements corresponding to the subject, or determines 142 whether the one or more current image elements are negative image elements not corresponding to the subject.

In one embodiment of step 240, referring generally to FIGS. 1A and 5A-5C, the cascade recognition system 100 of UAV 102 further identifies and extracts one or more image elements corresponding to specific human beings (e.g., subject persons 122 vs. non-subject persons) utilizing micro-scaled visual recognition techniques/algorithms. In one embodiment, the micro-scaled visual recognition techniques/algorithms include, but are not limited to, using Haar-like features, Viola-Jones facial recognition, and infrared/color pattern detection techniques. In one embodiment, micro-scaled visual recognition techniques are more efficiently employed when assembling subject profiles associated with one or more subjects 122 in advance, while medium-scale or macro-scale techniques are more efficiently employed for real-time or near real-time image analysis. For example, the UAV 102 may be able to acquire multiple, detailed reference images of the subjects 122 from multiple distances and perspectives, assembling an individual profile for each subject 122 based on a detailed analysis of the subject's facial features as in FIGS. 5A-5C. Once the subject's facial features have been analyzed, and the associated reference image elements added to the subject profile and stored in database 138b, the cascade recognition system 100 may augment these micro-scale reference image elements with medium-scale and macro-scale information, e.g., about the clothing or dimensions of each individual subject. The visual recognition module 108 may then use medium-scale or macro-scale data to differentiate positive image elements from negative image elements if micro-scale visual recognition techniques cannot be employed with sufficient confidence.

In one embodiment, the determination (e.g., 140, 142, or 144) is made using micro-scaled visual recognition techniques/algorithms including, but not limited to, using Haar-like features, Viola-Jones facial recognition, and infrared/color pattern detection techniques. In this regard, the one or more processors of UAV 102 utilize the identified and extracted positive image elements of step 230 to determine whether the positive image elements correspond to the subject defined in step 210. The determination of negative image elements (e.g., elements not corresponding to a subject) also occurs at this step. For example, referring to FIGS. 5A-5C, visual recognition module 108 may have identified an image element (e.g., 402, 404, or 406) as corresponding to a human being. In this regard, the visual recognition module 108 may further analyze the element (e.g., 402) on a micro-scale to identify and extract the facial region 502 or individual facial features 504, 506, 508, or 510 within region 502, which may or may not correspond to the subject (e.g., subject defined in step 210).

Figure 5A:
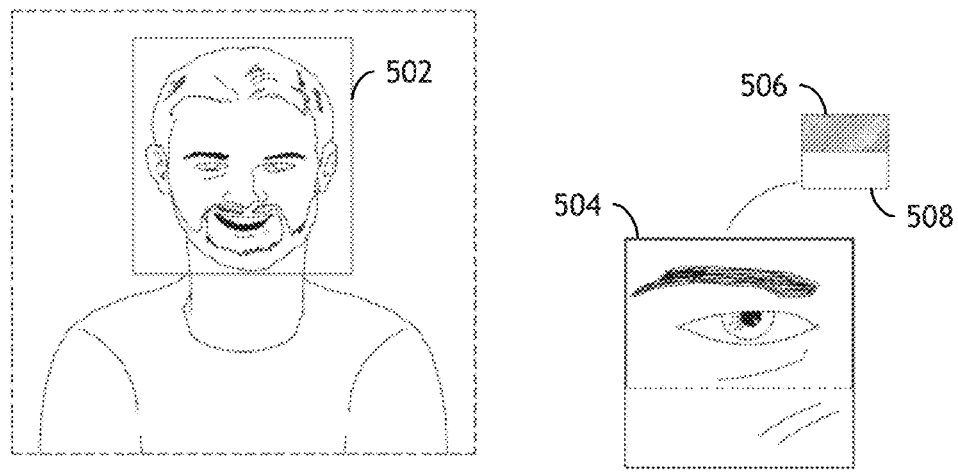
FIGS. 5A-5C illustrate respective views of an image tracking/analysis process of an UAV utilizing Haar-like features, Viola-Jones facial recognition, and infrared/color pattern detection techniques to acquire one or more images of a subject to track the subject, according to embodiments of this disclosure.
Figure 5B:
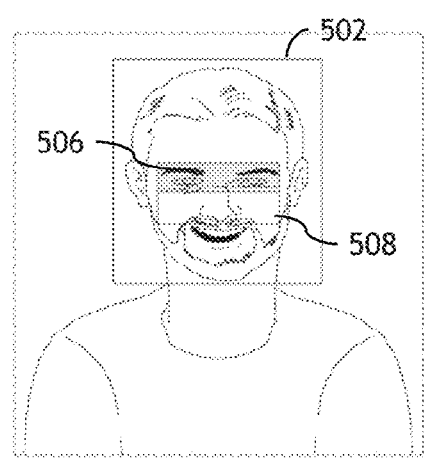
Figure 5C:
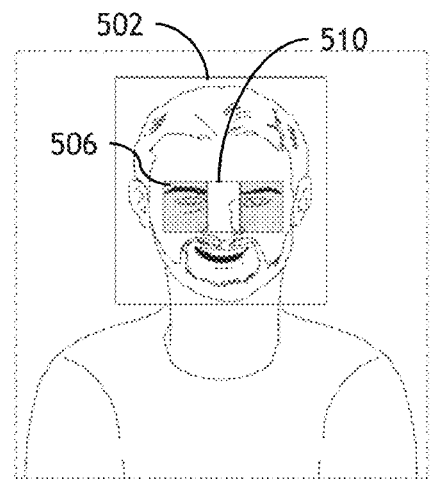

Applicant notes the horizontal, medium-scaled facial feature recognition algorithms and/or Haar-like features depicted in FIGS. 5A and 5B are merely for illustrative and explanatory purposes, as other algorithms are encompassed by the visual recognition methods of this disclosure. For example, referring to FIG. 5C, a vertical, medium-scaled facial feature recognition algorithm may be used to determine one or more features of a specific human being.

In step 250, cascade recognition system 100 stores in a positive database 136 the current positive image elements determined in step 240 to correspond to the subject 122. For example, the visual recognition module 108 may determine in step 240 that one or more current image elements correspond to a subject (e.g., subject 122 or 304—defined in step 210). In this regard, the one or more current image elements are determined to be positive image elements and are stored in the positive database 136, indicating a correspondence to the current subject 122.

In step 260, cascade recognition system 100 stores in a negative database 138a the current image elements determined in step 240 not to correspond to the subject. For example, the visual recognition module 108 may determine in step 240 that one or more current image elements do not correspond to the subject (e.g., they correspond to non-subjects: tree 306, tree 408, tower 412, mountain 414; or they correspond to other (ex.—potential) persons who are not the defined subject, such as subjects 402, 404, and 406). In one embodiment, the positive database 136 and negative database 138a are populated with image elements that establish foreground and background position, hue and color scheme, patterns, or other distinguishing features to precisely determine what aspects of the current image correspond (or do not correspond) to the subject 122.

In step 270, the subject tracking module 124 determines one or more attributes of a subject 122 by performing a comparison of one or more image elements. In this regard, the comparison may be between the one or more current image elements and a positive image element, a negative image element, or a reference image element. For example, the subject tracking module 124 may compare a current positive image element (i.e., extracted from the most recent image captured by camera 106 and analyzed by visual recognition module 108) corresponding to the subject 122 with one or more prior positive image elements stored in positive database 136 and corresponding to earlier representations of the subject 122. Referring to FIG. 3A, the subject tracking module may compare current and prior positive image elements corresponding to skier 304 (a selected subject currently being tracked by UAV 102) and determine that (e.g., over the course of multiple frames) that skier 304 has moved slightly to the left relative to his/her position in the frame 302a. Accordingly, the subject tracking module 124 may direct the attitude control system 126 of UAV 102 to keep skier 304 centrally framed by rotating UAV 102 slightly to the left (resulting in frame 302b). Referring to FIG. 3B, the subject tracking module 124 may instead determine that skier 304, while still centrally framed, is transitioning to a crouching position. In this instance, the subject tracking module 124 may instead instruct the attitude control system to adjust the pitch angle of UAV 102 downward in anticipation of an approaching down-sloping portion of the course.

Figure 4B:
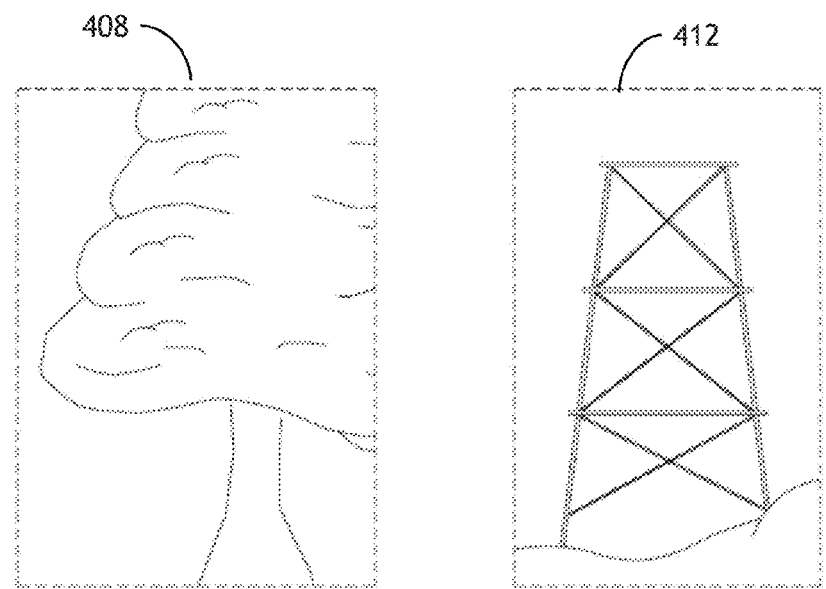

In one embodiment, referring to FIGS. 4A and 4B, at step 270 the subject tracking module 124 may instead compare a current negative image element with a prior negative image element stored in negative database 138a, or a second reference image element stored in negative database 138b, to determine one or more attributes of subject 124 by deriving information about the environment through which subject 122 is passing. For example, the visual recognition module 108 may have previously determined that tree 408, tower 412, and mountain 414 do not correspond to the subject, or to a human being, and stored any image elements associated with these objects in negative database 138a (or as reference image elements in negative database 138b). As additional image elements corresponding to tree 408, tower 412, or mountain 414 accumulate in negative database 138a, however, the subject tracking module 128 may compare sequential image elements to determine to what extent, if any, the subject 122 is approaching each of tree 408, tower 412, and mountain 414. This way the subject tracking module 124 may estimate a relative distance between the subject 122 and tree 408, tower 412, and mountain 414, or estimate a position of the subject 122 relative to tree 408, tower 412, or mountain 414, depending on the available information.

In one embodiment, the subject tracking module 124 may compare current or prior negative image elements with reference image elements stored in negative database 138b to determine one or more attributes of subject 122. For example, tower 412 may be a known landmark of known height and location. The subject tracking module may be tracking subject 122 at a predetermined distance, and may have estimated the height of subject 122 from reference image elements in the subject profile of subject 122. Therefore if the current image displays a positive image element corresponding to subject 122 and a negative image element corresponding to tower 412 (the negative image element indicating a height of tower 412 relative both to subject 122 and to the frame), the negative image element can be compared to a reference image element of tower 412 if such a reference image element is stored in negative database 138*b*. If a reference image element corresponding to tower 412 exists in negative database 138*b*, the reference image element may be associated with metadata associated with a reference relationship between one or more reference image elements, e.g., an actual height or other dimension of tower 412, or a relative height of tower 412 as seen by a subject from one or more distances or perspectives. In one embodiment, metadata associated with a reference image element is associated with a reference relationship between one or more reference image elements, e.g., The subject tracking module 124 may then compare one or more negative image elements corresponding to tower 412 to the reference image element in negative database 138*b*, thus making inferences about the relative distance between subject 122 and tower 412 or a position of subject 122 relative to tower 412.

In one embodiment, successive captured images may thus allow the subject tracking module 124 to determine a heading of the subject (e.g., subject 122) based on changes in relative position to fixed landmarks such as tower 412. In one embodiment, the UAV 102 incorporates a GPS receiver or other position sensor connected to the cascade recognition system 100 and capable of determining an absolute position or absolute heading of the subject 122.

Figure 6A:
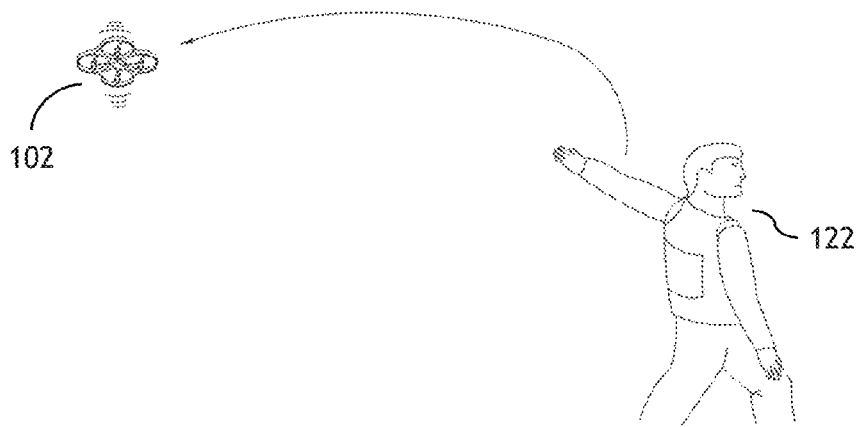
FIGS. 6A-6C illustrate respective side views of an UAV adjusting one or more rotor speeds of the UAV due to one or more command gestures given by a subject, according to embodiments of this disclosure.
Figure 6B:
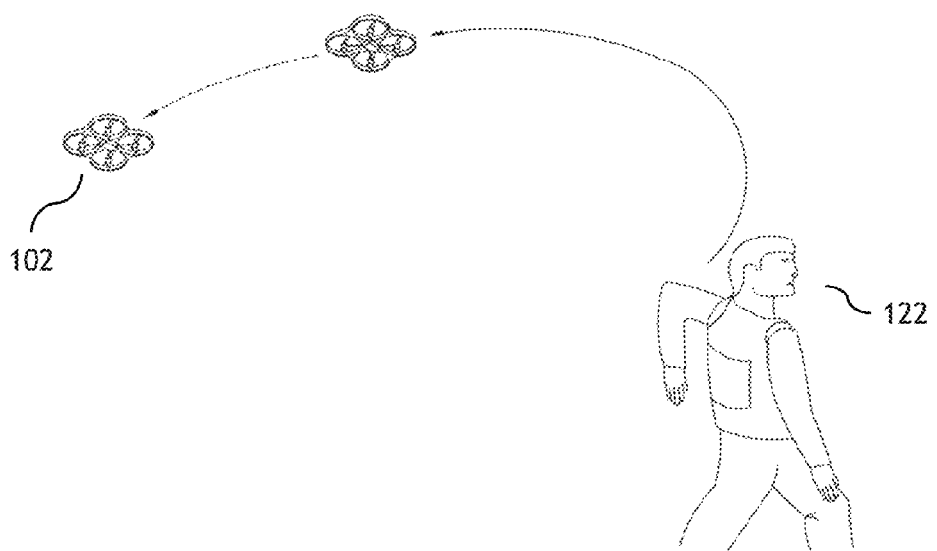
Figure 6C:
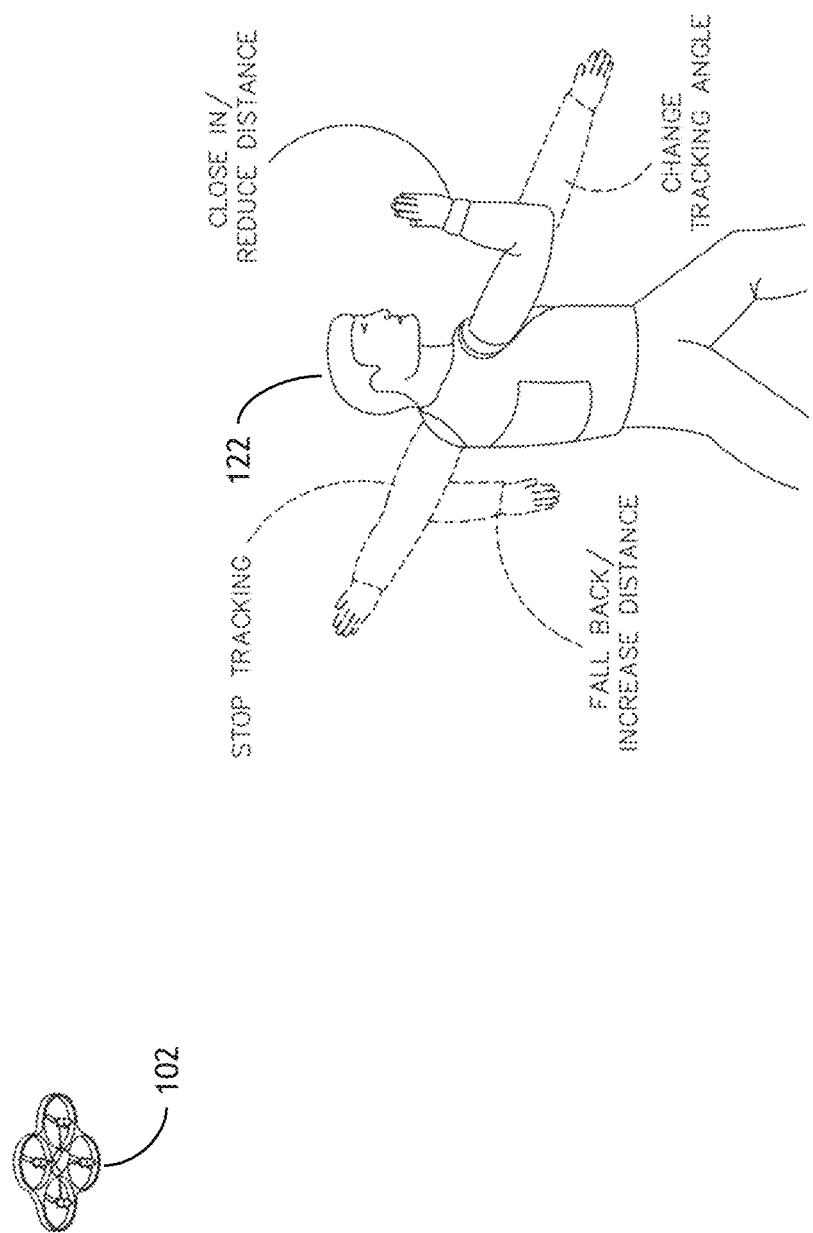

In one embodiment, referring to FIGS. 1A and 6A-6C, the cascade recognition system 100 determines one or more attributes of the subject including one or more command gestures. In one embodiment, the cascade recognition system 100 records one or more command gestures, each command gesture associated with one or more command functions (e.g., increase distance, change position, or abandon subject). For example, UAV 102 may be communicatively coupled with one or more cameras, including, but not limited to, camera 106. In this regard, the subject 122 may direct the UAV 102 to record a sequence of images depicting the performance of distinctive gestures. Referring to FIG. 6A, a distinctive command gesture may include a subject 122 briefly raising the left arm at a 90° angle to the torso. A sequence of reference image elements corresponding to this sequence of images (and thus to the command gesture) may then be stored in the negative database 138*b*. The sequence of images or image elements may be further associated with a particular confidence level and/or a counter.

In one embodiment, a UAV (e.g., UAV 102) tracking a subject (e.g., subject 122), having identified at least one positive image element corresponding to the subject via the visual recognition module 108, compares the at least one positive image element to one or more reference image elements corresponding to a command gesture and stored in negative database 138*b* via the subject tracking system 124. For example, a current positive image element may correspond to one or more reference image elements associated with a particular command gesture (and related command function, e.g., "reduce tracking distance by half") to a predetermined confidence level. The subject tracking system 124 may then increment a counter associated with the command gesture and continue to compare incoming positive image elements to the reference image element/s associated with the particular command gesture. Should the counter reach a predetermined threshold (i.e., a predetermined number of sequential positive image elements correspond to the command gesture), the cascade recognition system 100 may determine that the associated command gesture has been identified to a sufficient confidence level and direct the attitude control system 126 to execute any procedures or functions associated with the command gesture (i.e., close to half the current tracking distance). In one embodiment, the subject tracking module 124 will only initiate the command gesture detection process if the gesture is performed by an identified subject 122, ignoring any gestures performed by non-subjects.

In step 280, the attitude control system 126 adjusts at least one at least one rotor speed of the UAV 102 based on the one or more determined attributes of the subject (e.g., subject 122), as directed by the subject tracking module 124. For example, referring to FIGS. 1A-1B, having determined one or more attributes of subject 122, which may include at least an orientation (e.g., direction of travel 128 in FIG. 1B), the subject tracking module 124 directs the attitude system 126 of UAV 102 to adjust at least one rotor speed (thereby adjusting the position, orientation, velocity, and/or direction of the UAV 102) to match at least the orientation or direction of travel 132 of the UAV 102 to the orientation or direction of travel 128 of the subject 122.

In one embodiment the attitude control system 126 adjusts at least one rotor speed of the UAV 102 based on one or more determined command gestures (e.g., attributes) of subject 122. For example, the visual recognition module 108 may identify and extract image elements from a current image and determine those identified image elements correspond to the subject 122. THe subject tracking module 124 may then determine that one or more positive image elements correspond to one or more distinctive command gestures. The subject tracking module 124 may then direct the attitude control system 126 of UAV 102 to perform any procedures or functions associated with the command gestures. In one embodiment, referring to FIG. 1B, the subject tracking station 124 of base station 150 signals the attitude control systems 126 of (ex.—transmits attitude signals to) one or more UAVs 102, 154, 156, 158 to execute procedures or functions associated with identified command gestures.

In one embodiment, the one or more attitude signals cause UAV 102 to adjust one or more rotor speeds, such that the UAV tracks the subject 122 from a different or new position. For example, referring to FIG. 6B, if a command gesture includes subject 122 holding the left arm at a 90° angle to the torso and the left forearm at a 90° angle to the left bicep, the UAV 102 may then assume a new position more distant from the subject 122.

Applicant notes that the command gestures given above are merely for illustrative and explanatory purposes. In one embodiment, the UAV 102, camera 106, visual recognition module 108, and subject tracking module 124 are further configured to recognize multiple distinctive command gestures, each of which may stop or adjust a one or more rotor speeds of the UAV 102. For example, referring to FIG. 6C, a distinctive command gesture of the left arm held out straight away from the torso may be associated with stopping the tracking of the subject 122. By way of another example, a distinctive command gesture of the right arm being held out straight away from the torso may be associated with changing a tracking angle of the UAV 102. Applicant notes that additional distinctive command gestures associated with additional command procedures or functions will be recognized by those skilled in the art, and are encompassed in embodiments of this disclosure.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

While particular aspects of the subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

We claim:

1. A system for acquiring and following a subject with at least one unmanned aerial vehicle (UAV) the UAV having at least one rotor configured to rotate at a rotor speed, the system comprising:
    at least one camera fixed to the UAV, the at least one camera configured to capture at least one image;
    at least one attitude control system configured to adjust a rotor speed of the at least one rotor;
    at least one data storage unit fixed to the UAV;
    a plurality of databases stored in the data storage unit, including at least a first database of at least one first image element corresponding to the subject and a second database of at least one second image element not corresponding to the subject;
    at least one visual recognition module coupled to the at least one camera and to the plurality of databases, the at least one visual recognition module configured to:
        extract at least one current image element from the at least one image;
        determine whether the at least one current image element is a first current image element or a second current image element;
        store the at least one first current image element in the first database; and
        store the at least one second current image element in the second database; and
    at least one subject tracking module coupled to the at least one visual recognition module and to the at least one attitude control system, the at least one subject tracking module configured to:
        define the subject by analyzing at least one reference image captured by the at least one camera;
        determine at least one attribute of the subject by performing at least one comparison of at least one current image element with at least one of a first image element and a second image element; and
        direct the attitude control system of the UAV to adjust at least one rotor speed of the UAV based on the at least one attribute; and
    at least one transmitter configured to transmit the at least one image via wireless link.

2. The system of claim 1, wherein the at least one subject tracking module is configured to
    designate at least one image as a reference image;
    designate at least one first current image element of the reference image as a first reference image element;
    designate at least one second current image element of the reference image as a second reference image element;
    determine at least one reference relationship between at least two of a first reference image element and a second reference image element;
    populate at least one of the first database and the third database with the at least one first reference image element;
    populate at least one of the second database and the third database with the at least one second reference image element; and
    populate the third database with the at least one reference relationship.

3. The system of claim 2, wherein the at least one subject tracking module is configured to
    determine at least one attribute of the subject by performing at least one comparison of at least one current image element with at least one of a first image element, a second image element, and a reference image element.

4. The system of claim 2, wherein the at least one reference relationship corresponds to at least one of a location, a dimension, an orientation, a time, an atmospheric condition, and a gesture of the subject.

5. The system of claim 4, wherein the at least one subject tracking module is configured to populate the third database with at least one procedure associated with a gesture of the subject.

6. The system of claim 5, wherein the at least one subject tracking module is configured to direct the at least one attitude control system of the UAV to adjust at least one rotor speed of the at least one UAV based on the at least one procedure.

7. The system of claim 1, wherein the at least one first image element corresponds to at least one of a hue of the subject, a color scheme of the subject, a texture of the subject, a shape of the subject, a face of the subject, a facial feature of the subject, and a body part of the subject.

8. The system of claim 1, wherein the at least one second image element corresponds to at least one of a non-subject person, a manmade structure, and a natural feature.

9. The system of claim 1, wherein the at least one visual recognition module is configured to determine whether the at least one current image element corresponds to at least one of a foreground element, a background element, a hue, a color scheme, a texture, a face, a facial feature, a Haar-like feature, a body part, a shape, a manmade structure, a natural feature, and a landmark.

10. The system of claim 1, wherein the at least one visual recognition module is configured to determine whether the at least one current image element corresponds to the subject via at least one of a facial feature recognition algorithm, a facial recognition algorithm, a color pattern detection algorithm, and an infrared detection algorithm.

11. The system of claim 1, further comprising:
two or more UAVs, each UAV having
an airframe;
at least one rotor fixed to the airframe, each rotor configured to rotate at a rotor speed;
at least one camera fixed to the UAV, the at least one camera configured to capture at least one image;
an attitude control system configured to adjust a rotor speed of the at least one rotor; and
at least one transmitter configured to transmit the at least one image via wireless link.

12. The system of claim 11, wherein the data storage unit, the visual recognition module, and the subject tracking module are embodied in a ground-based station coupled to the at least one UAV via wireless link.

13. The system of claim 11, wherein each UAV of the two or more UAVs comprises:
a data storage unit of the at least one data storage unit;
a visual recognition module of the at least one visual recognition module; and
a subject tracking module of the at least one subject tracking module.

14. The system of claim 1, further comprising:
at least one display device wirelessly coupled to the at least one transmitter, the at least one display device configured to receive the at least one image and display the at least one image to a user.

15. The system of claim 14, wherein the at least one display device includes at least one of a pair of goggles configured to display the at least one image to the wearer, a smartphone, and a portable computing device.

16. An unmanned aerial vehicle (UAV), comprising:
an airframe;
at least one rotor fixed to the airframe, each rotor configured to rotate at a rotor speed;
at least one camera fixed to the UAV, the at least one camera configured to capture at least one image;
an attitude control system configured to adjust a rotor speed of the at least one rotor;
a data storage unit fixed to the UAV;
a plurality of databases stored in the data storage unit, including at least a first database of at least one first image element corresponding to the subject and a second database of at least one second image element not corresponding to the subject;
a visual recognition module coupled to the at least one camera and to the plurality of databases, the visual recognition module configured to:
extract at least one current image element from the at least one image;
determine whether the at least one current image element is a first current image element or a second current image element;
store the at least one first current image element in the first database; and
store the at least one second current image element in the second database; and
a subject tracking module coupled to the visual recognition module and to the attitude control system, the subject tracking module configured to:
define the subject by analyzing at least one reference image captured by the at least one camera;
determine at least one attribute of the subject by performing at least one comparison of at least two of a first image element, a second image element, and a current image element; and
direct the attitude control system of the UAV to adjust at least one rotor speed of the UAV based on the at least one attribute; and
at least one transmitter configured to transmit the at least one image via wireless link.

17. A method of acquiring and following a subject via at least one unmanned aerial vehicle, (UAV), comprising:
defining a subject by capturing at least one reference image via at least one camera of the at least one UAV;
capturing at least one first image via the at least one camera;
extracting at least one current image element from the at least one first image;
determining whether the at least one current image element is a first image element corresponding to the subject or a second image element not corresponding to the subject;
storing the at least one first image element in a first database;
storing the at least one second image element in the second database; and a second database;
determining at least one attribute of the subject by performing a comparison of the at least one current image element to at least one of a first image element, a second image element, and a reference image element; and
adjusting at least one rotor speed of the at least one UAV based on at least the at least one attribute of the subject.

18. The method of claim 17, wherein defining a subject by capturing at least one reference image via at least one camera of the at least one UAV includes:
capturing at least one image including the subject;
designating the at least one image as a reference image;
extracting at least one reference image element from the at least one reference image;
determining whether the at least one reference image element is a first reference image element corresponding to the subject or a second reference image element not corresponding to the subject;
determining at least one reference relationship between at least two of a first reference image element and a second reference image element;
populating at least one of the first database and a third database with the at least one first reference image element;
populating at least one of the second database and the third database with the at least one second reference image element; and
populating the third database with the at least one reference relationship.

19. The method of claim 18, wherein the at least one reference relationship corresponds to at least one of a location, a dimension, an orientation, a time, and an atmospheric condition.

20. The method of claim 18, wherein populating the third database with the at least one reference relationship includes:
   populating the third database with at least one procedure associated with a gesture of the subject.

21. The method of claim 20, wherein adjusting at least one rotor speed of the at least one UAV based on at least the at least one attribute of the subject includes:
   adjusting at least one rotor speed of the at least one UAV based on the at least one procedure.

22. The method of claim 17, wherein determining whether the at least one current image element is a first image element corresponding to the subject or a second image element not corresponding to the subject includes:
   comparing the at least one current image element to at least one of a first reference image element and a second reference image element.

23. The method of claim 17, wherein determining whether the at least one current image element is a first image element corresponding to the subject or a second image element not corresponding to the subject includes
   determining whether the at least one current image element corresponds to at least one of a foreground element, a background element, a hue, a color scheme, a texture, a face, a facial feature, a Haar-like feature, a body part, a shape, a manmade structure, a natural feature, and a landmark.

24. The method of claim 17, wherein determining whether the at least one current image element is a first image element corresponding to the subject or a second image element not corresponding to the subject includes
   determining whether the at least one current image element is a first image element corresponding to the subject or a second image element not corresponding to the subject via at least one of a facial feature recognition algorithm, a facial recognition algorithm, a color pattern detection algorithm, and an infrared detection algorithm.

25. The method of claim 17, wherein determining at least one attribute of the subject by performing a comparison of the at least one current image element to at least one of a first image element, a second image element, and a reference image element includes:
   determining at least one of a location of the subject, a position of the subject, an orientation of the subject, a gesture of the subject, and a heading of the subject.

26. The method of claim 17, further comprising:
   transmitting the at least one image to at least one non-subject user via wireless link.

* * * * *